(12) United States Patent
Glaser et al.

(10) Patent No.: US 11,384,781 B2
(45) Date of Patent: Jul. 12, 2022

(54) TURNBUCKLE

(71) Applicant: UNITED TECHNOLOGIES CORPORATION, Farmington, CT (US)

(72) Inventors: Seth Michael Glaser, Rocky Hill, CT (US); James Evans, South Windsor, CT (US); Michael C. Rhodes, Vernon, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 335 days.

(21) Appl. No.: 16/589,939

(22) Filed: Oct. 1, 2019

(65) Prior Publication Data

US 2021/0095707 A1    Apr. 1, 2021

(51) Int. Cl.
*F16B 7/06* (2006.01)
*F01D 25/24* (2006.01)

(52) U.S. Cl.
CPC ............. *F16B 7/06* (2013.01); *F01D 25/24* (2013.01); *F05D 2220/32* (2013.01)

(58) Field of Classification Search
CPC ......... F16B 7/06; F01D 25/24; F05D 2220/32
USPC .......................................................... 403/45
See application file for complete search history.

(56) References Cited

U.S. PATENT DOCUMENTS

| | | | | | |
|---|---|---|---|---|---|
| 1,242,066 | A | * | 10/1917 | Starr | E21B 17/042 403/47 |
| 1,374,963 | A | * | 4/1921 | Stevenson | F16G 11/12 403/44 |
| 1,452,268 | A | * | 4/1923 | Erickson | F16L 19/0206 403/287 |
| 1,755,305 | A | * | 4/1930 | Osborn | B61H 15/0028 188/202 |
| 2,354,474 | A | * | 7/1944 | Van Dyke | F16G 11/12 403/46 |
| 2,420,364 | A | * | 5/1947 | Espenas | F16G 11/12 403/48 |
| 2,479,096 | A | * | 8/1949 | Bratz | F16G 11/12 403/46 |
| 2,678,225 | A | * | 5/1954 | White | F16G 11/12 403/46 |
| 2,678,226 | A | * | 5/1954 | White | F16B 39/16 403/46 |
| 2,694,586 | A | * | 11/1954 | Smith | F16B 7/06 403/46 |

(Continued)

*Primary Examiner* — Hung Q Nguyen
*Assistant Examiner* — Anthony Donald Taylor, Jr.
(74) *Attorney, Agent, or Firm* — Snell & Wilmer L.L.P.

(57) ABSTRACT

A turnbuckle for adjustably locking a component of a gas turbine engine to an engine static structure is disclosed. In various embodiments, the turnbuckle includes an outer body having a first internal threading and an outer body witness hole, the outer body defining a first end configured for attachment to the component; an inner body having a first external threading, the inner body defining a second end configured for attachment to the engine static structure; and a coupling body having a second internal threading configured to threadedly engage the first external threading and a second external threading configured to engage the first internal threading, wherein the outer body witness hole extends through the outer body and is configured to detect a first short-threading of the second external threading within the first internal threading.

16 Claims, 5 Drawing Sheets

(56) References Cited

U.S. PATENT DOCUMENTS

| | | | | |
|---|---|---|---|---|
| 3,053,552 A | | 9/1962 | Horney | |
| 3,081,116 A | * | 3/1963 | Weiner | F16G 11/12 403/44 |
| 3,295,764 A | * | 1/1967 | Geary | F42B 10/665 239/265.41 |
| 3,454,293 A | * | 7/1969 | Howlett | F16G 11/12 403/44 |
| 3,876,316 A | * | 4/1975 | Sandovist | E04G 7/22 403/44 |
| 3,938,822 A | * | 2/1976 | Guerriero | B60G 21/0551 280/86.758 |
| 4,025,207 A | * | 5/1977 | Johnson, Jr. | F16B 7/06 403/46 |
| 4,081,219 A | * | 3/1978 | Dykmans | F16B 7/06 403/301 |
| 4,198,174 A | * | 4/1980 | Borowiec | F16B 7/06 29/896.7 |
| 4,560,147 A | * | 12/1985 | Bowdren | B60T 11/04 254/231 |
| 4,571,936 A | * | 2/1986 | Nash | F02C 7/20 60/797 |
| 4,778,194 A | * | 10/1988 | Koch | A01B 59/004 172/448 |
| 5,004,367 A | * | 4/1991 | Wood, Jr. | F16B 39/36 403/46 |
| 5,429,447 A | * | 7/1995 | Wood | F16B 7/06 403/290 |
| 5,702,196 A | * | 12/1997 | Petercsak | F16B 7/06 280/93.502 |
| 5,765,957 A | * | 6/1998 | Connell | F16C 7/06 403/44 |
| 5,906,450 A | * | 5/1999 | Ng | F16G 11/12 403/46 |
| 6,161,981 A | * | 12/2000 | Dehlin | F16G 11/12 403/45 |
| 6,902,342 B1 | | 6/2005 | Ditzler | |
| 6,939,074 B2 | * | 9/2005 | Gethmann | F16K 31/44 403/43 |
| 7,182,544 B2 | * | 2/2007 | Irrer | B62D 7/20 280/93.51 |
| 7,249,907 B2 | * | 7/2007 | Kay | B60P 7/0838 403/45 |
| 7,552,913 B1 | * | 6/2009 | Amoss | F16G 11/12 403/44 |
| 8,505,879 B2 | * | 8/2013 | Ruan | F16G 3/006 403/44 |
| 9,366,315 B2 | * | 6/2016 | Tylaska | F16G 11/02 |
| 9,695,854 B2 | * | 7/2017 | Gutta | F16B 7/06 |
| 2008/0245004 A1 | * | 10/2008 | Pryor | E04C 5/165 52/223.4 |

\* cited by examiner

TURNBUCKLE

FIELD

The present disclosure relates generally to gas turbine engines and, more particularly, to adjustable and lockable turnbuckles used in gas turbine engines to adjustably secure components.

BACKGROUND

Gas turbine engines typically include a fan section, a compressor section, a combustor section and a turbine section. The fan section drives air along a bypass flow path while the compressor section drives air along a core flow path. In general, during operation, air is pressurized in the compressor section and is mixed with fuel and burned in the combustor section to generate hot combustion gases. Subsequent to combustion, the hot combustion gases flow through the turbine section, which extracts energy from the hot combustion gases to power the compressor section and other gas turbine engine loads, such as those required to rotate a fan in the fan section. The compressor section typically includes low pressure and high pressure compressors, and the turbine section includes low pressure and high pressure turbines.

Various components within a gas turbine engine are designed for periodic adjustment in positioning. Such components include, for example, ducts associated with environmental control systems or nacelle anti-ice systems, variable stator vanes, air-oil coolers and active-clearance control mechanisms. Currently, turnbuckles or similar mechanisms may be used to adjust the positioning of such components with respect to other components or with respect to a frame or a static structure. However, making small adjustments to the positioning often requires disassembly of the turnbuckle from the component, or repeated iterations of disassembly and reassembly until a desirable positioning of the component is achieved. Turnbuckles of simple construction that exhibit ease of adjustment will increase the efficiency of performing routine maintenance and repair procedures for gas turbine engines and related equipment.

SUMMARY

A turnbuckle for adjustably locking a component of a gas turbine engine to an engine static structure is disclosed. In various embodiments, the turnbuckle includes an outer body having a first internal threading and an outer body witness hole, the outer body defining a first end configured for attachment to the component; an inner body having a first external threading, the inner body defining a second end configured for attachment to the engine static structure; and a coupling body having a second internal threading configured to threadedly engage the first external threading and a second external threading configured to engage the first internal threading, wherein the outer body witness hole extends through the outer body and is configured to detect a first short-threading of the second external threading within the first internal threading.

In various embodiments, the inner body has an inner body witness hole disposed on the second external threading and configured to detect a second short-threading of the first external threading within the second internal threading. In various embodiments, the first internal threading and the second external threading define a right-handed thread pattern. In various embodiments, the first external threading and the second internal threading define a left-handed thread pattern.

In various embodiments, the first internal threading extends along a first internal length and the outer body witness hole is disposed at a first location between forty percent and sixty percent of the first internal length. In various embodiments, the first external threading extends along a first external length and the inner body witness hole is disposed at a second location between forty percent and sixty percent of the first external length.

In various embodiments, a first jam nut is configured for threaded engagement with the second external threading and to lock the coupling body within the outer body. In various embodiments, a second jam nut is configured for threaded engagement with the first external threading and to lock the inner body within the coupling body.

In various embodiments, the outer body and the first jam nut are configured to receive a first lock wire configured to lock the first jam nut from turning on the second external threading. In various embodiments, the coupling body and the second jam nut are configured to receive a second lock wire configured to lock the second jam nut from turning on the first external threading.

In various embodiments, the outer body includes a first proximal lock wire aperture configured to receive a first end of the first lock wire and the first jam nut includes a first distal lock wire aperture configured to receive a second end of the first lock wire. In various embodiments, the coupling body includes a second proximal lock wire aperture configured to receive a first end of the second lock wire and the second jam nut includes a second distal lock wire aperture configured to receive a second end of the second lock wire.

A method for adjustably locking a component of a gas turbine engine to an engine static structure is disclosed. In various embodiments, the method includes adjusting a coupling body having a second internal threading configured to threadedly engage a first external threading of an inner body connected to the engine static structure and a second external threading configured to engage a first internal threading of an outer body connected to the component; locking the coupling body to the outer body using a first jam nut threadedly engaged with the second external threading; and locking the inner body to the coupling body using a second jam nut threadedly engaged with the first external threading.

In various embodiments, the method includes inspecting for a first short-threading of the second external threading within the first internal threading via an outer body witness hole. In various embodiments, the method includes inspecting for a second short-threading of the first external threading within the second internal threading via an inner body witness hole. In various embodiments, the method includes securing a first lock wire between the outer body and the first jam nut. In various embodiments, the method includes securing a second lock wire between the coupling body and the second jam nut.

An apparatus for adjustably locking a component of a gas turbine engine to an engine static structure includes an outer body having a first end configured for attachment to the component, a first internal threading and an outer body witness hole; an inner body having a second end configured for attachment to the engine static structure and a first external threading; and a coupling body having a second internal threading configured to threadedly engage the first external threading and a second external threading configured to engage the first internal threading, wherein the outer body witness hole extends through the outer body and is configured to detect a first short-threading of the second external threading within the first internal threading.

In various embodiments, the inner body has an inner body witness hole disposed on the second external threading and configured to detect a second short-threading of the first external threading within the second internal threading. In various embodiments, the first internal threading extends along a first internal length and the outer body witness hole is disposed at a first location between forty percent and sixty percent of the first internal length and the first external threading extends along a first external length and the inner body witness hole is disposed at a second location between forty percent and sixty percent of the first external length.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the following detailed description and claims in connection with the following drawings. While the drawings illustrate various embodiments employing the principles described herein, the drawings do not limit the scope of the claims.

DETAILED DESCRIPTION

The following detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that changes may be made without departing from the scope of the disclosure. Thus, the detailed description herein is presented for purposes of illustration only and not of limitation. Furthermore, any reference to singular includes plural embodiments, and any reference to more than one component or step may include a singular embodiment or step. Also, any reference to attached, fixed, connected, or the like may include permanent, removable, temporary, partial, full or any other possible attachment option. Additionally, any reference to without contact (or similar phrases) may also include reduced contact or minimal contact. It should also be understood that unless specifically stated otherwise, references to "a," "an" or "the" may include one or more than one and that reference to an item in the singular may also include the item in the plural. Further, all ranges may include upper and lower values and all ranges and ratio limits disclosed herein may be combined. Further, the term "about" is intended to include a degree of error associated with measurement of a particular quantity based upon equipment or techniques otherwise available at the time of filing the application. For example, "about" may include a range of ±8% or 5% or 2% of a given value.

Figure 1:
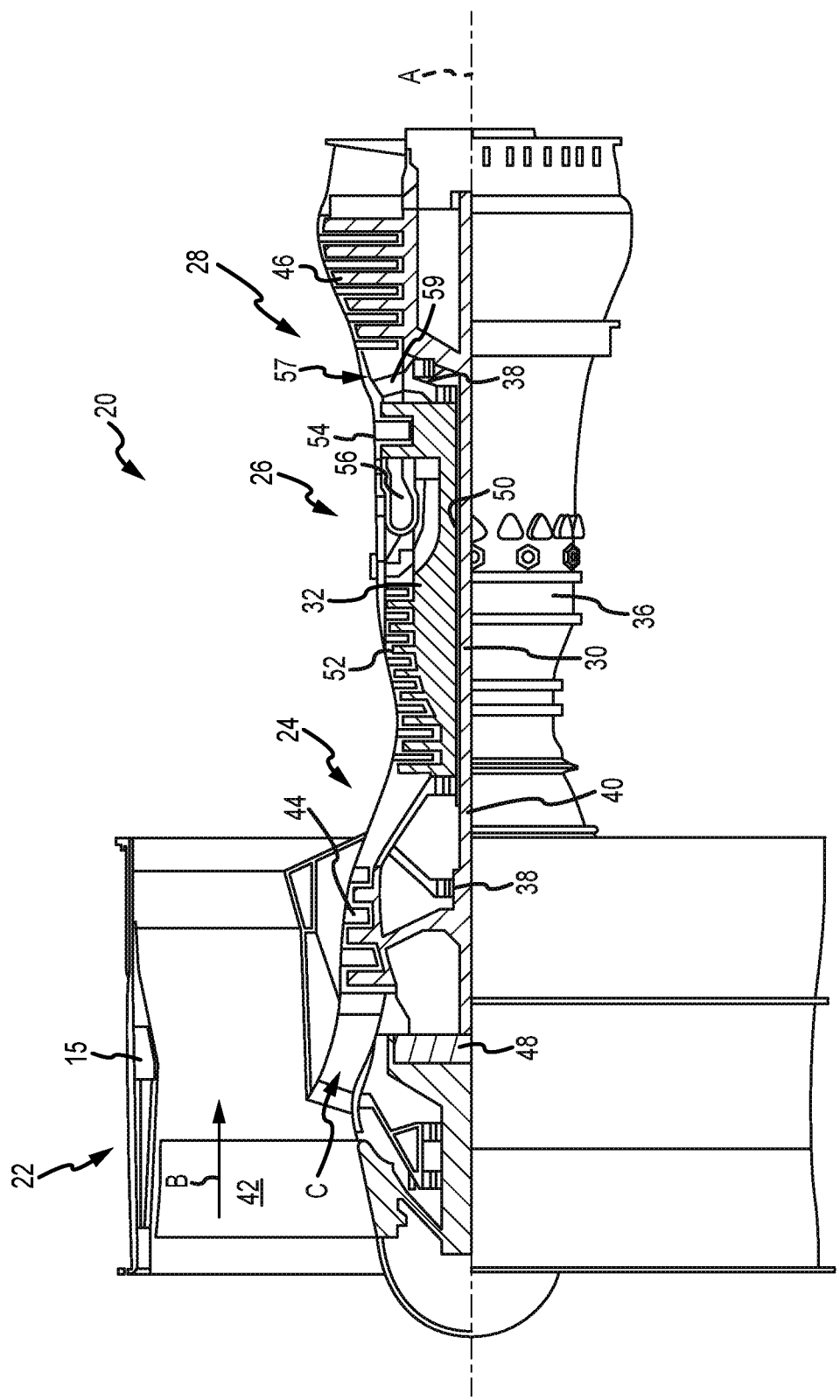
FIG. 1 is a cross sectional schematic view of a gas turbine engine, in accordance with various embodiments.

Referring now to the drawings, FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a nacelle 15, while the compressor section 24 drives air along a core flow path C for compression and communication into the combustor section 26 and then expansion through the turbine section 28. Although depicted as a two-spool turbofan gas turbine engine in the disclosed non-limiting embodiment, the concepts described herein are not limited to use with two-spool turbofans as the teachings may be applied to other types of turbine engines.

The gas turbine engine 20 generally includes a low speed spool 30 and a high speed spool 32 mounted for rotation about an engine central longitudinal axis A relative to an engine static structure 36 via several bearing systems 38. Various bearing systems at various locations may alternatively or additionally be provided and the location of the several bearing systems 38 may be varied as appropriate to the application. The low speed spool 30 generally includes an inner shaft 40 that interconnects a fan 42, a low pressure compressor 44 and a low pressure turbine 46. The inner shaft 40 is connected to the fan 42 through a speed change mechanism, which in this gas turbine engine 20 is illustrated as a fan drive gear system 48 configured to drive the fan 42 at a lower speed than that of the low speed spool 30. The high speed spool 32 includes an outer shaft 50 that interconnects a high pressure compressor 52 and a high pressure turbine 54. A combustor 56 is arranged in the gas turbine engine 20 between the high pressure compressor 52 and the high pressure turbine 54. A mid-turbine frame 57 of the engine static structure 36 is arranged generally between the high pressure turbine 54 and the low pressure turbine 46 and may include airfoils 59 in the core flow path C for guiding the flow into the low pressure turbine 46. The mid-turbine frame 57 further supports the several bearing systems 38 in the turbine section 28. The inner shaft 40 and the outer shaft 50 are concentric and rotate via the several bearing systems 38 about the engine central longitudinal axis A, which is collinear with longitudinal axes of the inner shaft 40 and the outer shaft 50.

The air in the core flow path C is compressed by the low pressure compressor 44 and then the high pressure compressor 52, mixed and burned with fuel in the combustor 56, and then expanded over the high pressure turbine 54 and the low pressure turbine 46. The low pressure turbine 46 and the high pressure turbine 54 rotationally drive the respective low speed spool 30 and the high speed spool 32 in response to the expansion. It will be appreciated that each of the positions of the fan section 22, the compressor section 24, the combustor section 26, the turbine section 28, and the fan drive gear system 48 may be varied. For example, fan drive gear system 48 may be located aft of the combustor section 26 or even aft of the turbine section 28, and the fan section 22 may be positioned forward or aft of the location of the fan drive gear system 48.

Figure 2:
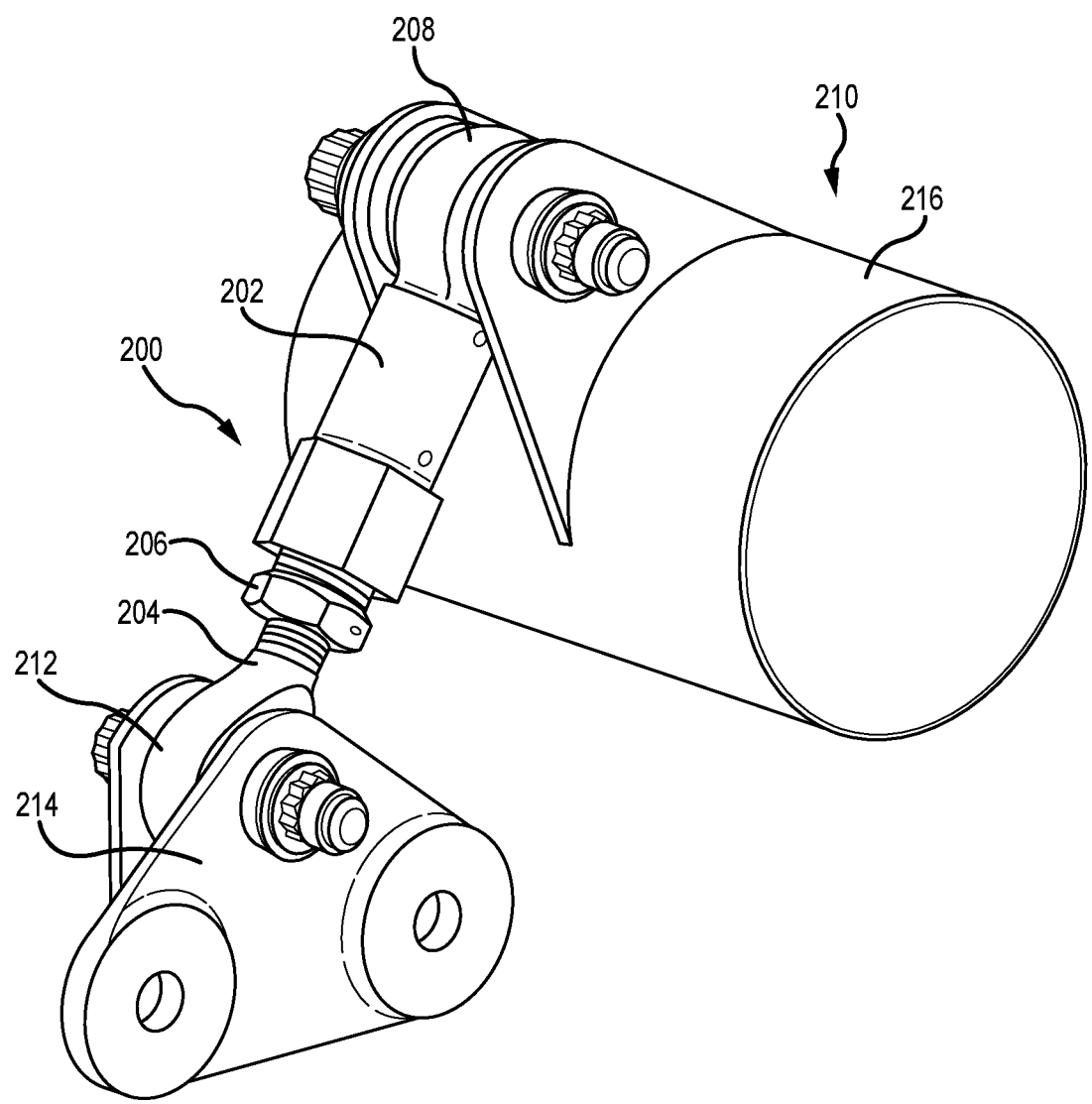
FIG. 2 is a perspective schematic view of a duct secured to a mount via a turnbuckle, in accordance with various embodiments.

Referring now to FIG. 2, a turnbuckle 200 is illustrated, in accordance with various embodiments. The turnbuckle 200 includes an outer body 202, an inner body 204 and a coupling body 206, configured to threadedly couple the outer body 202 to the inner body 204. In various embodiments, the turnbuckle 200 includes a first end 208 configured for connecting to a component 210 of a gas turbine engine, such as, for example, the gas turbine engine 20 described above with reference to FIG. 1. In various embodiments, the turnbuckle 200 also includes a second end 212 configured for connecting to a mounting structure 214. The mounting structure 214 may, in various embodiments, be secured to a static structure within the gas turbine engine, such as, for example, the engine static structure 36 described above with reference to FIG. 1. The component 210 may represent, for example, a duct 216 associated with an environmental control system or a nacelle anti-ice system; a linkage connected to a variable stator vane system; an air-oil cooler or an active-clearance control mechanism. Thus, while the component 210 illustrated in FIG. 2 is described in terms of the duct 216, the disclosure contemplates the component 210 to include any component typically found in a gas turbine engine that benefits from periodic routine adjustment or maintenance.

Figure 3A:
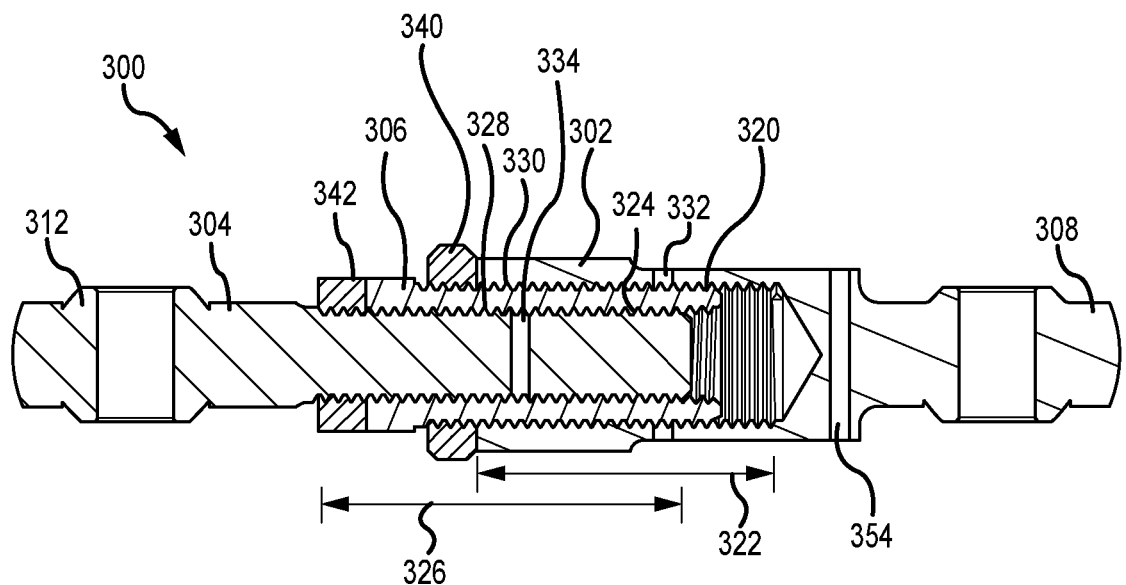
FIG. 3A is a cross sectional schematic view of a turnbuckle, in accordance with various embodiments.
Figure 3B:
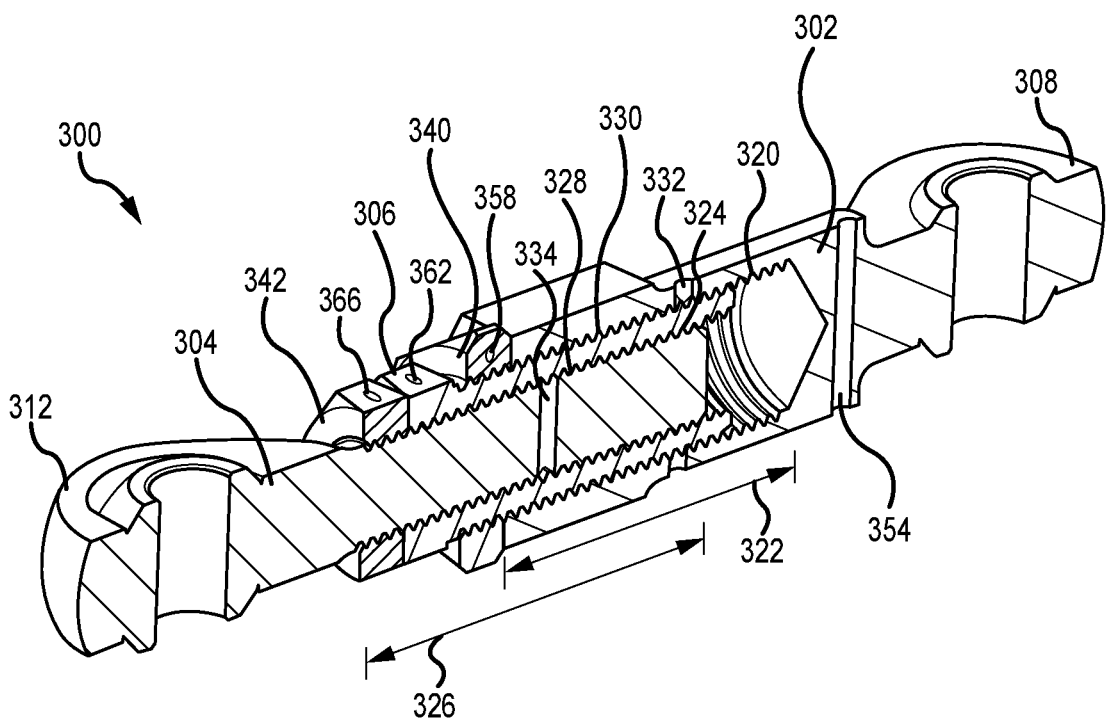
FIG. 3B is a perspective schematic view of a turnbuckle, in accordance with various embodiments.

Referring now to FIGS. 3A and 3B, further details of a turnbuckle 300, such as, for example, the turnbuckle 200 described above with reference to FIG. 2, are described. Similar to the description above, the turnbuckle 300 includes an outer body 302, an inner body 304 and a coupling body 306, configured to threadedly couple the outer body 302 to the inner body 304. A first end 308 of the turnbuckle 300 is integral or monolithic with the outer body 302 and configured to connect to a component of a gas turbine engine, while a second end 312 is integral or monolithic with the inner body 304 and configured to connect to a mounting structure within the gas turbine engine.

In various embodiments, the outer body 302 includes a hollow portion having a first internal threading 320 extending along a first internal length 322 of an internal wall of the hollow portion. The inner body 304, similarly, includes an solid portion having a first external threading 324 extending along a first external length 326 of an external wall of the solid portion. The coupling body 306, which is configured to threadedly couple the outer body 302 and the inner body 304, includes a second internal threading 328 configured to threadedly engage the first external threading 324 and a second external threading 330 configured to engage the first internal threading 320. In various embodiments, the first internal threading 320 and the second external threading 330 define a right-handed thread pattern (or, in various embodiments, a left-handed thread pattern), while the first external threading 324 and the second internal threading 328 define a left-handed thread pattern (or, in various embodiments, a right-handed thread pattern).

In various embodiments, the outer body 302 includes an outer body witness hole 332 that extends through the outer body 302 and through the first internal threading 320 at a first location within a range of from about forty percent (40%) to about sixty percent (60%) of the first internal length 322. The outer body witness hole 332 facilitates visual inspection or detection of a short-threading (or a first short-threading) of the coupling body 306 and the outer body 302. More specifically, if the second external threading 330 has not sufficiently engaged the first internal threading 320, such that the second external threading 330 is not visible or has otherwise not blocked the outer body witness hole 332, then a short-threading has occurred, requiring the coupling body 306 to be threaded further into the outer body 302.

Similarly, in various embodiments, the inner body 304 includes an inner body witness hole 334 that extends at least partially through the inner body 304 and into the first external threading 324 at a second location within a range of from about forty percent (40%) to about sixty percent (60%) of the first external length 326. The inner body witness hole 334 facilitates visual inspection or detection of a short-threading (or a second short-threading) of the coupling body 306 and the inner body 304. More specifically, if the first external threading 324 has not sufficiently engaged the second internal threading 328, such that the inner body witness hole 334 is visible outside the second internal threading 328, then a short-threading has occurred, requiring the inner body 304 to be threaded further into the coupling body 306.

Still referring to FIGS. 3A and 3B, in various embodiments, the turnbuckle 300 includes a first jam nut 340 configured for threaded engagement with the second external threading 330 and to lock the coupling body 306 within or against the outer body 302. Similarly, in various embodiments, the turnbuckle 300 includes a second jam 342 nut configured for threaded engagement with the first external threading 324 and to lock the inner body 304 within or against the coupling body 306. As described further with reference to FIG. 4, additional features, in the form of lock wires, are configured to provide additional capabilities of locking the turnbuckle 300 in place following adjustment.

Figure 4:
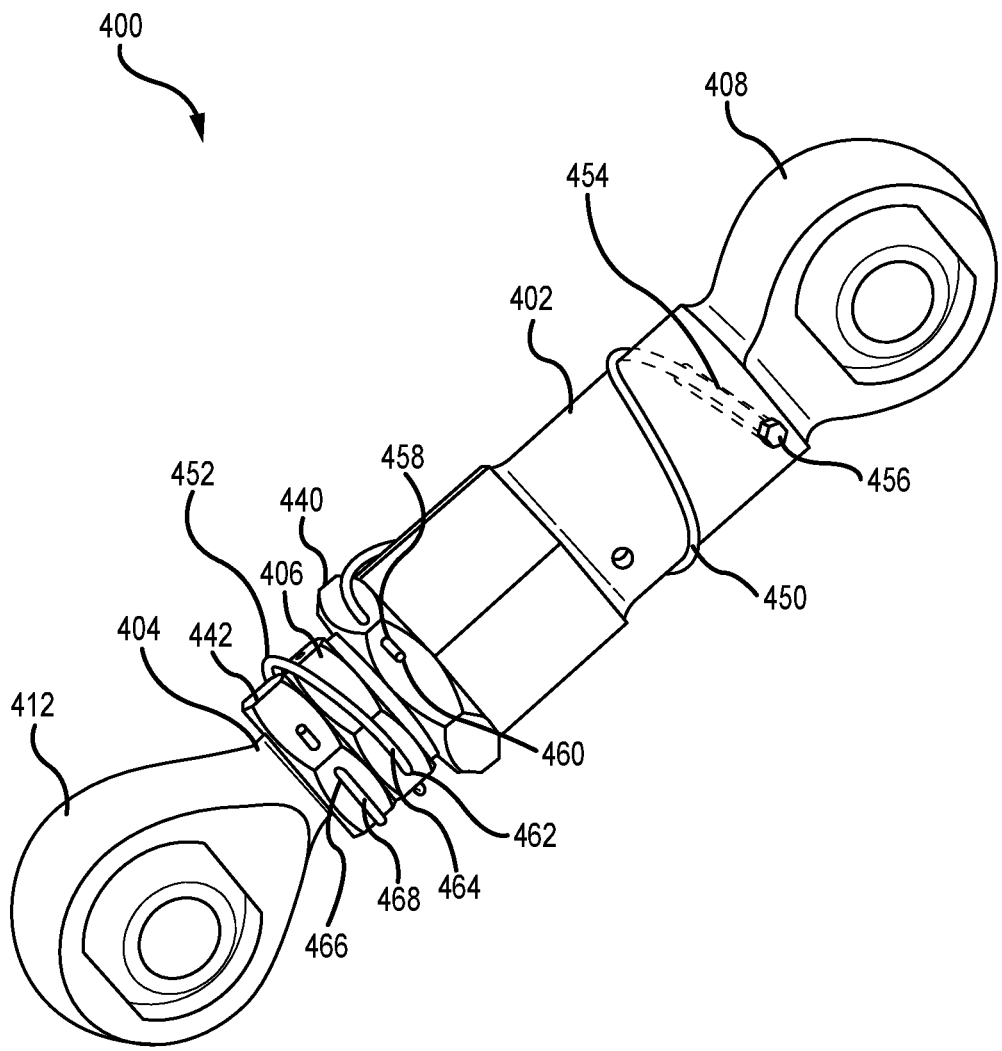
FIG. 4 is a perspective schematic view of a turnbuckle, in accordance with various embodiments.

Referring now to FIG. 4, a turnbuckle 400, similar to the turnbuckle 200 and the turnbuckle 300 described above with reference to FIG. 2 and FIGS. 3A and 3B, is illustrated. Similar to the description above, the turnbuckle 400 includes an outer body 402, an inner body 404 and a coupling body 406, configured to threadedly couple the outer body 402 to the inner body 404. A first end 408 of the turnbuckle 400 is integral or monolithic with the outer body 402 and configured to connect to a component of a gas turbine engine, while a second end 412 is integral or monolithic with the inner body 404 and configured to connect to a mounting structure within the gas turbine engine. The outer body 402, the inner body 404 and the coupling body 406 include an internal threading or an external threading as described above, so the details of such are not repeated here.

Still referring to FIG. 4, the turnbuckle includes a first jam nut 440 configured for threaded engagement with a second external threading of the coupling body 406 (see, e.g., the second external threading 330 illustrated in FIGS. 3A and 3B) and to lock the coupling body 406 within or against the outer body 402. Similarly, in various embodiments, the turnbuckle 400 includes a second jam nut 442 configured for threaded engagement with a first external threading of the inner body 404 (see, e.g., the first external threading 324 illustrated in FIGS. 3A and 3B) and to lock the inner body 404 within or against the coupling body 406.

In various embodiments, the outer body 402 and the first jam nut 440 are configured to receive a first lock wire 450 configured to prevent the first jam nut 440 from turning on the second external threading (see, e.g., the second external threading 330 illustrated in FIGS. 3A and 3B). Similarly, in various embodiments, the coupling body 406 and the second jam nut 442 are configured to receive a second lock wire 452 configured to prevent the second jam nut 442 from turning on the first external threading (see, e.g., the first external threading 324 illustrated in FIGS. 3A and 3B). In various embodiments, the outer body 402 includes a first proximal lock wire aperture 454 configured to receive a first end 456 of the first lock wire 450 and the first jam nut 440 includes a first distal lock wire aperture 458 configured to receive a second end 460 of the first lock wire 450 (see also a first proximal lock wire aperture 354 and a first distal lock wire aperture 358 illustrated in FIG. 3B). Similarly, the coupling body 406 includes a second proximal lock wire aperture 462 configured to receive a first end 464 of the second lock wire 452 and the second jam nut 442 includes a second distal lock wire aperture 466 configured to receive a second end 468 of the second lock wire 452 (see also a second proximal lock wire aperture 362 and a second distal lock wire aperture 366 illustrated in FIG. 3B).

Figure 5:
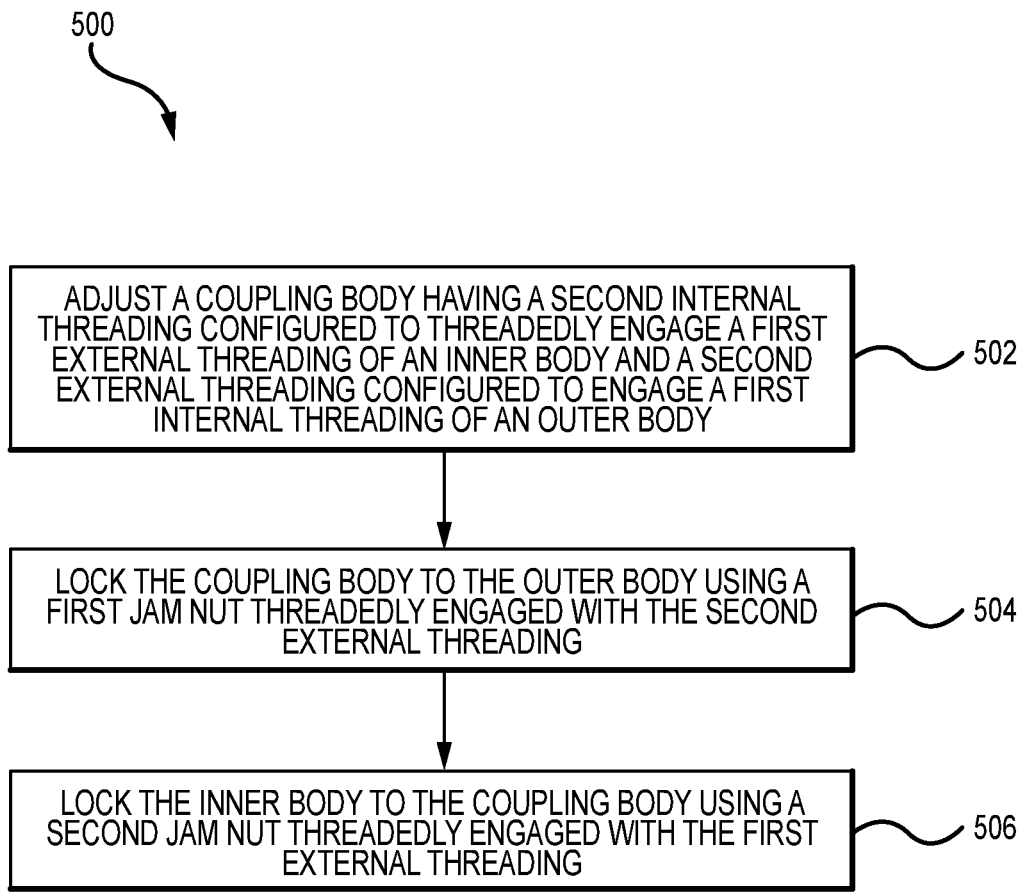
FIG. 5 is a flowchart depicting a method of operating an adjustable turnbuckle, in accordance with various embodiments.

Referring now to FIG. 5, a method 500 for adjustably locking a component of a gas turbine engine to an engine static structure is disclosed as comprising the following steps. A first step 502 includes adjusting a coupling body having a second internal threading configured to threadedly engage a first external threading of an inner body connected to the engine static structure and a second external threading configured to engage a first internal threading of an outer body connected to the component. A second step 504 includes locking the coupling body to the outer body using a first jam nut threadedly engaged with the second external threading. A third step 506 includes locking the inner body to the coupling body using a second jam nut threadedly engaged with the first external threading.

In various embodiments, the method 500 further includes inspecting for a first short-threading of the second external threading within the first internal threading via an outer body witness hole. In various embodiments, the method 500 further includes inspecting for a second short-threading of the first external threading within the second internal threading via an inner body witness hole. In various embodiments, the method 500 further includes securing a first lock wire between the outer body and the first jam nut. In various embodiments, the method 500 further includes securing a second lock wire between the coupling body and the second jam nut.

In various embodiments, the method and apparatus described herein enable small and accurate adjustments to be made to the length between a component of a gas turbine engine and a mounting structure for the component in spaces that are too short along an axial direction (e.g., the length between the mounting positions of two components or a component and a static structure) or otherwise too restricted in size for standard three-piece turnbuckles to fit. The short overall length of the turnbuckles described herein obviate this drawback resulting from size restrictions. In addition, the method and apparatus obviate a drawback of standard two-piece extendable links that limit adjustment to increments of one-hundred eighty degree 3.14 rad) turns of either the outer body or the inner body (both of which are connected to one another via a threaded connection and without a coupling body). The drawback is obviated, for example, by enabling small turns of the coupling body using, for example, a wrench adapted to grip a hex head formed integrally with the coupling body (see, e.g., the coupling body 306 illustrated in FIGS. 3A and 3B). Once the adjustment is made, the first and second jam nuts lock the apparatus and firmly fix the length between the component and the mounting structure.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

Finally, it should be understood that any of the above described concepts can be used alone or in combination with any or all of the other above described concepts. Although various embodiments have been disclosed and described, one of ordinary skill in this art would recognize that certain modifications would come within the scope of this disclosure. Accordingly, the description is not intended to be exhaustive or to limit the principles described or illustrated herein to any precise form. Many modifications and variations are possible in light of the above teaching.

What is claimed:

1. A turnbuckle for adjustably locking a component of a gas turbine engine to a static structure, the turnbuckle comprising:

an outer body having a first internal threading and an outer body witness hole, the outer body defining a first end configured for attachment to the component;

an inner body having a first external threading, the inner body defining a second end configured for attachment to the static structure; and a coupling body having a second internal threading configured to engage the first external threading and a second external threading configured to engage the first internal threading, wherein the outer body witness hole extends through the outer body and is configured to permit visualization of a first short-threading of the second external threading within the first internal threading, and wherein the inner body has an inner body witness hole disposed on the first external threading and configured to permit visualization of a second short-threading of the first external threading within the second internal threading when the inner body witness hole is visible outside the second internal threading.

2. The turnbuckle of claim 1, wherein the first internal threading and the second external threading define a right-handed thread pattern.

3. The turnbuckle of claim 2, wherein the first external threading and the second internal threading define a left-handed thread pattern.

4. The turnbuckle of claim 3, wherein the first internal threading extends along a first internal length and the outer body witness hole is disposed at a first location between forty percent and sixty percent of the first internal length.

5. The turnbuckle of claim 4, wherein the first external threading extends along a first external length and the inner body witness hole is disposed at a second location between forty percent and sixty percent of the first external length.

6. The turnbuckle of claim 5, further comprising a first jam nut configured for threaded engagement with the second external threading and to lock the coupling body within the outer body.

7. The turnbuckle of claim 6, further comprising a second jam nut configured for threaded engagement with the first external threading and to lock the inner body within the coupling body.

8. The turnbuckle of claim 7, wherein the outer body and the first jam nut are configured to receive a first lock wire configured to prevent the first jam nut from turning on the second external threading.

9. The turnbuckle of claim 8, wherein the coupling body and the second jam nut are configured to receive a second lock wire configured to prevent the second jam nut from turning on the first external threading.

10. The turnbuckle of claim 9, wherein the outer body includes a first proximal lock wire aperture configured to receive a first end of the first lock wire and the first jam nut includes a first distal lock wire aperture configured to receive a second end of the first lock wire.

11. The turnbuckle of claim 10, wherein the coupling body includes a second proximal lock wire aperture configured to receive a first end of the second lock wire and the second jam nut includes a second distal lock wire aperture configured to receive a second end of the second lock wire.

12. A method for adjustably locking a component of a gas turbine engine to a static structure, the method comprising:

adjusting a coupling body having a second internal threading configured to engage a first external threading of an inner body connected to the static structure and a second external threading configured to engage a first internal threading of an outer body connected to the component;

locking the coupling body to the outer body using a first jam nut engaged with the second external threading;

locking the inner body to the coupling body using a second jam nut engaged with the first external threading;

inspecting for a first short-threading of the second external threading within the first internal threading via an outer body witness hole that extends through the outer body; and inspecting for a second short-threading of the first external threading within the second internal threading via an inner body witness hole disposed on the first external threading when the inner body witness hole is visible outside the second internal threading.

13. The method of claim 12, further comprising securing a first lock wire between the outer body and the first jam nut.

14. The method of claim 13, further comprising securing a second lock wire between the coupling body and the second jam nut.

15. An apparatus for adjustably locking a component of a gas turbine engine to a static structure, the apparatus comprising:

an outer body having a first end configured for attachment to the component, a first internal threading, and an outer body witness hole;

an inner body having a second end configured for attachment to the static structure and a first external threading; and a coupling body having a second internal threading configured to engage the first external threading and a second external threading configured to engage the first internal threading, wherein the outer body witness hole extends through the outer body and is configured to permit visualization of a first short-threading of the second external threading within the first internal threading, and wherein the inner body has an inner body witness hole disposed on the first external threading and configured to permit visualization of a second short-threading of the first external threading within the second internal threading when the inner body witness hole is visible outside the second internal threading.

16. The apparatus of claim 15, wherein the first internal threading extends along a first internal length and the outer body witness hole is disposed at a first location between forty percent and sixty percent of the first internal length and wherein the first external threading extends along a first external length and the inner body witness hole is disposed at a second location between forty percent and sixty percent of the first external length.

\* \* \* \* \*